US011292221B2

(12) United States Patent
Schoellhammer et al.

(10) Patent No.: US 11,292,221 B2
(45) Date of Patent: Apr. 5, 2022

(54) PRESS AND PROCESS FOR OPERATING SAME

(71) Applicant: SCHULER PRESSEN GMBH, Goeppingen (DE)

(72) Inventors: Dietmar Schoellhammer, Goeppingen (DE); Uwe Kreth, Goeppingen (DE)

(73) Assignee: Schuler Pressen GmbH, Goeppingen (DE)

( * ) Notice: Subject to any disclaimer, the term of this patent is extended or adjusted under 35 U.S.C. 154(b) by 445 days.

(21) Appl. No.: 16/260,781

(22) Filed: Jan. 29, 2019

(65) Prior Publication Data
US 2019/0240941 A1 Aug. 8, 2019

(30) Foreign Application Priority Data
Feb. 8, 2018 (DE) ...................... 10 2018 102 809.1

(51) Int. Cl.
*B30B 15/14* (2006.01)
*B30B 15/26* (2006.01)
(Continued)

(52) U.S. Cl.
CPC .............. *B30B 15/14* (2013.01); *B21D 22/02* (2013.01); *B21D 22/06* (2013.01); *B21D 24/10* (2013.01);
(Continued)

(58) Field of Classification Search
CPC ....... B30B 15/14; B30B 15/148; B30B 15/26; B30B 15/16; B30B 15/166; B21D 24/10;
(Continued)

(56) References Cited

U.S. PATENT DOCUMENTS 7,231,798 B2 * 6/2007 Zhang et al. ............ B21D 7/00
72/342.5
2007/0032900 A1 * 2/2007 Venugopal et al. ... B21D 22/02
72/351
(Continued)

FOREIGN PATENT DOCUMENTS

DE     10 2016 205 704 A1    10/2017
DE     102016205704 A1 * 10/2017 ............. B30B 15/14
(Continued)

*Primary Examiner* — Adam J Eiseman
*Assistant Examiner* — Katie L. Parr
(74) *Attorney, Agent, or Firm* — Ronald S. Lombard

(57) ABSTRACT

A press and a process for operating it, has an upper tool and a lower tool for shaping a workpiece and a work unit including a press drive and/or a drawing device, is controllable by a controller, to perform the shaping process. The controller outputs, to the work unit, press process values, which define the sequence of events of the shaping process. Workpiece parameters characterize, for example, the material and/or the shape and/or at least one dimension and/or quality of the workpiece, which still has to be shaped or has already been shaped. The controller is assigned a composition matrix which contains, for each defined workpiece parameter and for each defined press process value, an individually changeable function, to describe the relationship between every one of the defined workpiece parameters and the defined press process values. This composition matrix allows a quick and rapid adjustment and adaptation of the press.

12 Claims, 4 Drawing Sheets

(51) Int. Cl.
*G01B 11/30* (2006.01)
*G05B 23/02* (2006.01)
*B21D 24/10* (2006.01)
*B21D 22/02* (2006.01)
*G05B 19/418* (2006.01)
*B30B 15/16* (2006.01)
*G05B 13/04* (2006.01)
*B21D 22/06* (2006.01)
*G05B 17/02* (2006.01)
*B21D 22/20* (2006.01)

(52) U.S. Cl.
CPC .............. *B30B 15/16* (2013.01); *B30B 15/26* (2013.01); *G01B 11/30* (2013.01); *G05B 13/042* (2013.01); *G05B 17/02* (2013.01); *G05B 19/418* (2013.01); *G05B 23/0294* (2013.01); *B21D 22/20* (2013.01); *G05B 2219/23399* (2013.01); *G05B 2219/2622* (2013.01); *G05B 2219/32182* (2013.01); *G05B 2223/02* (2018.08)

(58) Field of Classification Search
CPC ........ B21D 24/12; B21D 24/14; B21D 22/02; B21D 22/06; B21D 22/20; B21D 22/205; G05B 2219/2622; G05B 2219/45137; G05B 2219/32182; G05B 23/0294; G05B 17/00; G05B 17/02; G05B 13/042; G01B 11/30

USPC .... 100/43, 48, 50; 72/16.2, 16.8, 17.3, 18.1, 72/18.6, 18.7, 18.8, 21.4
See application file for complete search history.

(56) References Cited

U.S. PATENT DOCUMENTS

| | | | |
|---|---|---|---|
| 2007/0240470 A1* | 10/2007 | Suzuki et al. | B21D 22/20 72/14.9 |
| 2008/0092620 A1* | 4/2008 | Suzuki et al. | B21D 24/10 72/343 |
| 2009/0199609 A1* | 8/2009 | Butscher et al. | A61K 31/198 72/21.4 |
| 2009/0249850 A1* | 10/2009 | Baud et al. | B21D 31/06 72/21.4 |
| 2011/0094279 A1 | 4/2011 | Suzuki et al. | |
| 2011/0132208 A1 | 6/2011 | Asakawa et al. | |
| 2013/0231770 A1 | 9/2013 | Cole et al. | |

FOREIGN PATENT DOCUMENTS

| | | |
|---|---|---|
| EP | 1 688 196 A1 | 8/2006 |
| JP | 2002263742 A | 9/2002 |

* cited by examiner

007# PRESS AND PROCESS FOR OPERATING SAME

CROSS-REFERENCE TO RELATED APPLICATION

This application claims the priority of German Application No. 10 2018 102 809.1 filed Feb. 8, 2018. The said German Application No. 10 2018 102 809.1 is incorporated herein by reference in its entirety as though fully set forth.

BACKGROUND OF THE INVENTION

The invention relates to a press for shaping workpieces and a process for operating the press.

Diverse embodiments are known of presses for shaping workpieces, for example with a drawing device for deep drawing of a workpiece. The press has a work unit that performs the shaping process depending on the press process values. The work unit generally has one or more drives or actuators to perform the shaping. To accomplish this, the work unit can have, for example, a press drive for moving a ram with an upper tool and/or a drawing device, for example a die cushion with a lower tool. Every shaping job for shaping a workpiece requires that the adjustments of the press first be adapted to the current shaping job.

The press process values for the work unit of the press are, for example, the force that occurs between an upper tool and a lower tool when a workpiece is shaped, the speed and/or acceleration of an upper tool and/or a lower tool to shape the workpiece, or variables connected with them. These press process values must be adapted to the shaping job to produce shaped workpieces within the required tolerance and with the required surface finish. Today, this is done by experienced press operators, who first operate the press in an adjustment mode and repeatedly shape a workpiece and examine the shaped workpieces. Depending on the result of the examination, one or more press process values are adapted on the basis of the experience of the operator to achieve a shaped workpiece with the required accuracy and the desired quality. Operating a press in such an adjustment mode can involve the consumption of substantial quantities of material, which have to be disposed of as waste parts or recycled. Moreover, adjustment in the adjustment mode requires very experienced personnel and can be time-consuming. Consequently, the adjustment of a press to a new shaping job requires a lot of work and is cost-intensive.

It can be considered the goal of this invention to create a press and a process for operating it that allow improved adjustment of the press process values.

SUMMARY OF THE INVENTION

This is accomplished by a press and a process having the features of the claims.

The press has an upper tool and a lower tool for shaping a workpiece. A work unit of the press is controllable by a controller and is configured to perform the shaping process of the workpiece based on press process values. To accomplish this, the work unit has one or more drives or actuators, in particular to move the upper tool and the lower tool relative to one another or to press them against the workpiece. The work unit can optionally also include transfer devices, which are configured to transport the workpiece into the tool and/or out of the tool. The exact embodiment of the work unit depends on the embodiment of the press. For example, the work unit can have a drawing device. During the deep drawing, the upper tool and/or the lower tool for shaping the workpiece can be moved relative to a press frame of the press.

The workpiece is characterized, in its not yet shaped initial state and/or in its shaped state, by at least one workpiece parameter. For example, the at least one workpiece parameter can describe one or more of the following properties of the workpiece:

A measurement of the shaped workpiece, for example an indentation or thickness or wall thickness;

A material used of the workpiece;

A quality characteristic of the workpiece, for example the roughness of a surface section of the shaped workpiece;

The presence or absence of ripples or folds in a surface section of the shaped workpiece;

the presence or absence of one or more cracks in a surface section of the shaped workpiece.

As a rule, the relationship between such workpiece parameters and the press process values is complex, and describing it mathematically is impossible or requires a great deal of effort. Therefore, the invention assumes a relationship between every press process value defined in the controller and every workpiece parameter defined in the controller, and describes each relationship by an individually changeable function of a composition matrix. Thus, given a number n of press process values and a number m of workpiece parameters, this results in a composition matrix of individually changeable functions with n×m matrix elements or individually changeable functions. Both n and m are natural numbers greater than zero.

The controller is configured to determine the press process values on the basis of the composition matrix and thus all available functions, and to output them to the work unit. This achieves maximum flexibility in adjusting the press. The individually changeable functions allow a known or determined real relationship between a respective workpiece parameter and a respective press process value to be adjusted. A function can also define that there is no relationship between a respective press process value and a respective workpiece parameter.

Therefore, press operators engaged in adjustment operation have available multiple usable relationships between the predefined press process values and the predefined workpiece parameters. However, not all functions of the composition matrix really also need to be adjusted or adapted. Preferably, only part of the functions describe an operator-specifiable or modifiable dependence between the press process value and the workpiece parameter that are associated in each function. For example, an operator interface can display only these dependence-describing functions as modifiable. It goes without saying that the operators can also select, as modifiable, other functions which originally describe an independence between the respective associated press process value and the respective associated workpiece parameter, and/or can reset a function which describes a dependence between the respective associated press process value and the respective associated workpiece parameter, to define an independence.

If a priori knowledge is available, some of the functions can at least approximately describe the corresponding known dependence or independence between the respective workpiece parameter and the respective press process value. All functions of the composition matrix for which it is not known, or not yet known, whether there is a relationship between a respective workpiece parameter and a respective press process value, or what relationship this is, can define, in an initial state, an independence between the respective press process value and the respective workpiece parameter.

For example, adjustments of presses with similar shaping jobs and/or presses of the same press type and/or presses with comparable environmental conditions can be conveyed to the controller as a priori knowledge. The use of a priori knowledge can simplify and shorten the adjustment operation.

It is preferable that in an initial state every individually changeable function define an independence between the respective press process value and the respective workpiece parameter. As long as there is no knowledge about the relationships between the press process values and the workpiece parameters, all functions are in a corresponding initial state. In the initial state, a function outputs the same value of the press process parameter for all values of the workpiece parameter in question, and consequently can represent a constant function. Thus, in its initial state a function can be a line with a slope of zero. If a function describes a determined or known relationship between a workpiece parameter and a press process value and if the function is not in the initial state, at least sections of the function can have a slope that is not equal to zero and can be formed, e.g., by a line, multiple straight sections, or a curve of another shape. In one sample embodiment, all functions can be formed or approximated by one line each and/or multiple straight sections.

Preferably, every function describes a percent change—especially a constant percent change—in a respective press process value depending on a given percent change in the respective workpiece parameter. This makes it simple to predefine the relationship, without setting up complex mathematical models. Different curve shapes or slopes of the functions produce weighting between the individual functions. For example, a workpiece parameter can depend on multiple process values. For every dependence, a function is defined whose shape or slope can be different. This produces weighting of the influences of the different press process values on the same workpiece parameter.

In one sample embodiment, the controller is configured to receive input data. The input data can characterize the real relationship between at least one of the press process values and at least one of the workpiece parameters. The controller is configured to adapt each of the at least one associated functions to this real relationship. The input data can be input, for example, by an operator through an operator interface. The input data can also be received from an external data source through a communications link. For example, the press can communicate with a network through a communications link and receive input data through it, in particular operating data and adjustment data of other presses and, on the basis of this input data, update or optimize its own adjustments.

It is advantageous for the press to have a detection device. The detection device is configured to produce a detection signal and to forward it to the controller. The detection signal describes at least one or also more of the workpiece parameters defined in the controller. If this at least one workpiece parameter has a function in the composition matrix that specifies the dependence for an associated press process value, the controller can automatically adapt the press process value if, for example, a workpiece parameter is increasingly approaching a tolerance limit during the course of production.

In one sample embodiment, the detection device can have a sensor, especially an optical sensor, to produce a detection signal. An optical sensor can be, for example, a scanner or a camera. The scanner data of a shaped workpiece picked up by the scanner and/or a picture of the shaped workpiece picked up by the camera is forwarded to the controller, in order to determine, in the controller, one or more workpiece parameters from the detection signal in question (scanner data or picture). Preferably the detection device is configured to pick up a detection signal as long as the workpiece is located in the area between the lower tool and the upper tool, after the upper tool and the lower tool are or have been removed from one another following the shaping process. The detection signal can also be picked up while the workpiece is being moved, for example by a transfer device of the press. Preferably the shaped workpiece is ejected and transferred out of the press only after that.

As was already mentioned, the work unit can have a drawing device. The drawing device can be configured to allow adjustment of a value and/or behavior of the drawing force. Each value and/or behavior of the drawing force can be defined by one or more press process values.

It is also possible for the drawing device to be configured to allow adjustment of different drawing force values at different places on the upper tool and the lower tool. For example, the upper tool and the lower tool can be pressed against one another or against the workpiece with different drawing forces or different drawing force behaviors at different positions. These position-dependent drawing force values or drawing force behaviors can be characterized by one or more press process values.

In one sample embodiment the work unit can also have a lubrication device. The lubrication device is configured to apply a specified quantity of a lubricant onto the workpiece before shaping. The lubricant can be sprayed on, for example.

The work unit can have a drive device that is configured to move the upper tool and the lower tool relative to one another. The drive device can have, for example, a press drive to move a ram on which the upper tool is arranged. The drive device can also have a device to move the lower tool, for example a die cushion. The drive device can form, for example, a drawing device of the work unit. Depending on the press type, the lower tool can be arranged stationary on a press table in the stroke direction of the ram. Depending on the press type, the lower tool or the upper tool can be stationary during the shaping of the workpiece.

In one sample embodiment, the drive device can be configured to adjust the position and/or a time derivative of the position of the upper tool or of the lower tool. The position in question and/or its time derivative can each be characterized by one or more press process values. The time derivative of the position can be the speed, the acceleration, or the change in acceleration (jerk).

A workpiece parameter can be, for example, a dimension of the shaped workpiece. The workpiece parameter can describe, for example, an indentation, that is an edge width of an unshaped flat edge on the shaped workpiece. Other dimensions or measurements on the shaped workpiece can also be used as workpiece parameters, for example the thickness of the shaped workpiece at one or more places.

Other possible workpiece parameters are properties describing a material and/or a coating of the workpiece. The material or a coating can change the friction between the workpiece and the tools, which has an effect on the shaping and can make higher or lower holding forces necessary during deep drawing than are necessary, for example, for other materials.

At least one of the workpiece parameters can also describe the quality of a shaped workpiece. The quality can be described, for example, by a workpiece parameter that indicates whether a surface section of the shaped workpiece has ripples and/or folds and/or at least one crack. This information can make it possible to draw conclusions about whether a holding force is too high or too low during shaping the workpiece, especially during deep drawing.

During operation of the above-described press, all of the functions that are present are always used to determine the defined press process values depending on the defined workpiece parameters and to output them to the work unit of the press. If certain press process values have no relationship—or no relationship that is yet known—with certain workpiece parameters, then the associated function is defined so that it leaves the associated press process values unchanged, irrespective of the respective workpiece parameter. Thus, the press is configured to be able to take into consideration every relationship between a press process value and a workpiece parameter that is possible, depending on the current shaping job, and to use it when performing the shaping.

BRIEF DESCRIPTION OF THE DRAWINGS

Advantageous embodiments of the press and the process follow from the dependent claims, the description, and the drawings. Preferred sample embodiments of a press and a process for operating the press are explained in detail below using the attached drawings. The figures are as follows:

DETAILED DESCRIPTION OF THE INVENTION

Figure 1:
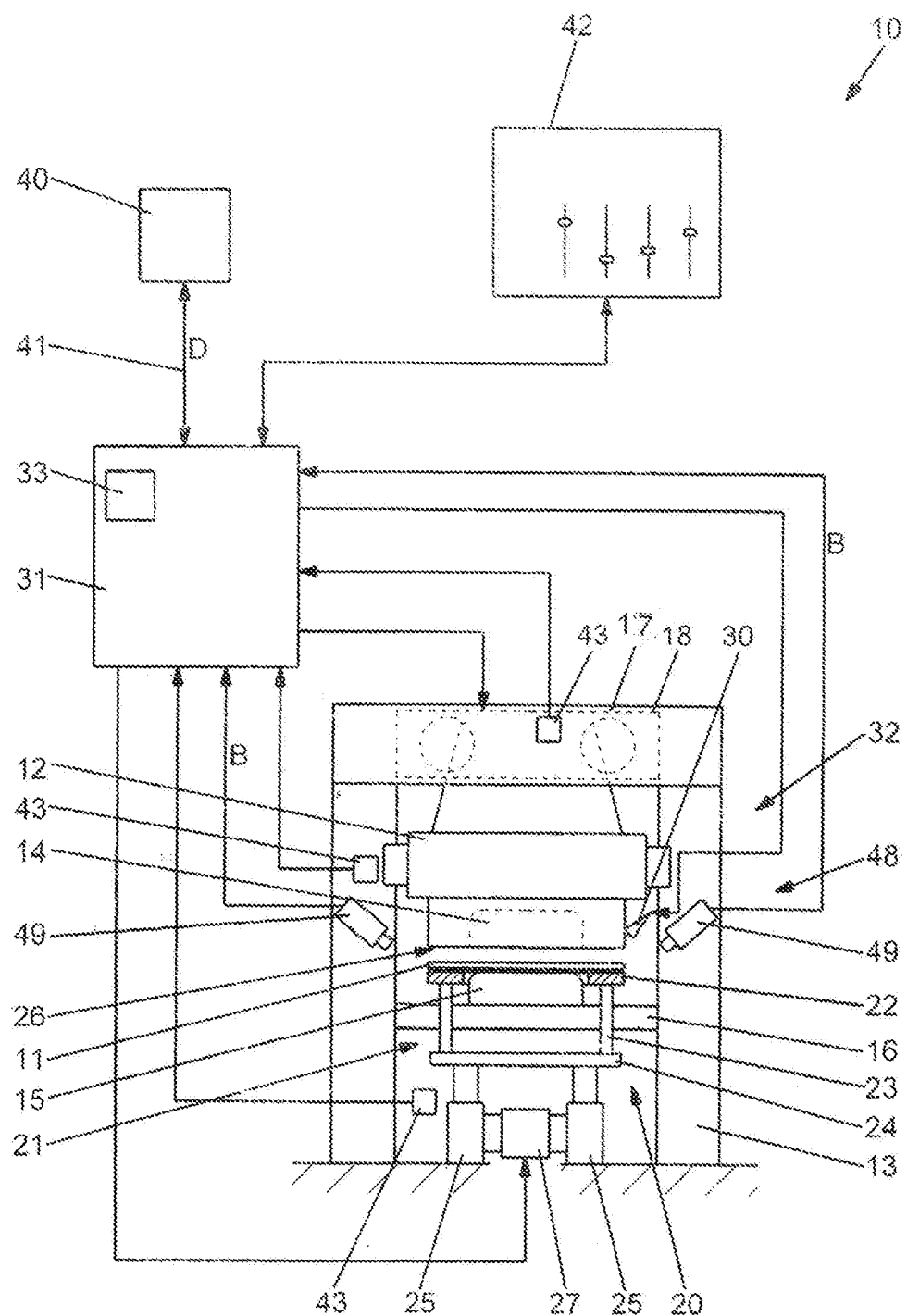
FIG. 1 is a block diagram-like schematic illustration of the principle of a sample embodiment of a press.

FIG. 1 shows a sample embodiment of a press 10 for shaping a workpiece 11. The press has a ram 12 that is linearly movable in a stroke direction and that is movably mounted, guided by a guide device that is arranged on a press frame 13 of the press 10. The ram 12 has arranged on it an upper tool 14 that cooperates with a lower tool 15 during shaping of the workpiece 11. The lower tool 15 can be arranged, for example, on a press table 16 that is supported on the press frame 13.

To move the upper tool 14 relative to the lower tool 15, the press 10 has a drive device 17. In the sample embodiment, the drive device 17 is formed by the press drive 18, which is movement-connected with the ram 12 and is configured to move the ram 12 in the stroke direction. The press drive 18 can be in the form of, for example, an eccentric drive and/or toggle drive and/or jointed drive with one or more motors, preferably servo motors.

In the sample embodiment illustrated here, the press 10 also has a drawing device 20. The drawing device 20 has a blank holding device 21 with a blank holding ring 22, on top of which it is possible to lay a workpiece 11 to be shaped above the lower tool 15. The blank holding ring 22 is supported on a suspended plate 24 through pressure thrust bolts 23. The suspended plate 24 is arranged on one or more lifting cylinders 25 in the stroke direction of the ram 12. The lifting cylinders 25 can move the blank holding device 21—which has the suspended plate 24, the thrust bolts 23, and the blank holding ring 22—in the stroke direction, in particular to adjust a drawing force F or a drawing force behavior during deep drawing of the workpiece 11. The drawing force is the force with which the workpiece 11 is clamped between the blank holding ring 22 and a blank holding surface 26 of the upper tool 14 during deep drawing.

The drawing device 20 can be in the form of a hydraulic or electro-hydraulic drawing device. To adjust the drawing force F or the drawing force behavior, the drawing device 20 according to the example has a hydraulic unit 27, which can supply hydraulic medium into the working chambers of the lifting cylinders 25 or remove it from them.

The number of thrust bolts 23 and the number of lifting cylinders 25 can vary. Increasing the number of lifting cylinders 25 or thrust bolts 23 can adjust different drawing forces at different places on the workpiece 11 to be shaped or the tool 14, 15.

A possible modification of the sample embodiment illustrated is for a stationary blank holding surface to be provided on the lower tool 15 or on the press bed 16 and for a blank holding ring serving for adjustment of the drawing force to be arranged on the ram 12 or an a separate blank holding ram that is movable independently of ram 12.

In the sample embodiment shown in FIG. 1, the ram 12 with the upper tool 14 is moved, by means of the press drive 18, in the direction toward the lower tool 15 during the deep drawing. A possible modification of this is that for deep drawing the lower tool 15 is moved in the direction toward the upper tool 14 by means of a drawing drive.

FIG. 1 also very schematically illustrates a lubrication device 30, which can apply a lubricant to the surface of the workpiece 11 to be shaped. Lubricating the surface of the workpiece 11 changes the sliding friction properties between the blank holding surface 26 and the surface of the workpiece 11. This affects the holding and clamping of the workpiece 11 between the blank holding ring 22 and the blank holding surface 26 during the deep drawing.

All drives and/or actuators of the press 10 which are usable during shaping or transport of the workpiece 11, and devices and means of the press 10 that can affect a workpiece parameter or the shaping result of the workpiece 11 form a work unit 32 of the press 10, this work unit 32 being controllable by a controller 31. According to the example, the work unit 32 includes the press drive 18, the drawing device 20, and the lubrication device 30. Depending on the embodiment of the press 10, other devices of the press 10 that are controllable by the controller 31 can be added or dropped here. For example, the work unit 32 of the press 10 can have a transfer device added to it, which is set up for workpiece transfer of the workpiece 11 to be shaped and/or for workpiece transfer of the shaped workpiece. In the simplest case, the work unit 32 can be formed by the press drive 18.

In order to coordinate or to control the various drives or controllable devices of the work unit 32, the controller 31 outputs press process values A1 through An. The press process values A1 through An define the sequence of events of a press cycle and can define, for example, one or more of the following properties:

A position of the ram 12 in the stroke direction;

A rate of motion of the ram 12 in the stroke direction;

An acceleration of the ram 12 in the stroke direction;

A drawing force F or a time-dependent or travel-dependent drawing force behavior during the shaping of a workpiece 11;

Different drawing forces and/or different drawing force behaviors at different places on the workpiece 11;

A quantity of a lubricant applied onto the surface of the workpiece 11 to be shaped;

A position and/or speed and/or acceleration of a transfer device for supplying a workpiece 11 to be processed and/or for transporting a shaped workpiece 11 away.

What press process values A1 through An are adjustable by the controller 31 depends on the specific embodiment of the press 10, and can vary. For this reason, the above-described list only includes examples, but is not limited to them.

The shaping result of the workpiece 11 can be changed by means of these press process values A1 through An to achieve the specified tolerances for individual dimensions and the quality of the shaped workpiece 11. The workpiece 11 itself is defined by workpiece parameters P1 through Pm. The workpiece parameters P1 through Pm characterize the shaped workpiece 11 and at least some of them can also characterize the not yet shaped workpiece 11. One or more of the following parameters can be used as workpiece parameters P1 through Pm:

A material and/or a coating of the workpiece 11 to be shaped;

At least one dimension of the workpiece 11 to be shaped, such as, for example, the thickness of a piece of sheet metal to be shaped, the length and/or the width and/or the diameter of a piece of sheet metal to be shaped;

At least one dimension of the shaped workpiece 11, such as, for example, an indentation E, which describes the width of a flat edge on a shaped workpiece 11 or the thickness of the material of the shaped workpiece 11 at one or more places;

The presence or absence of ripples or folds in a surface section of the shaped workpiece 11;

The presence or absence of at least one crack in a surface section of the shaped workpiece 11;

The roughness of the surface of a surface section of the shaped workpiece 11.

The list of the above-described workpiece parameters P1 through Pm includes examples, but is not limited to them.

All changeable press process values A1 through An that are relevant for adjusting the press 10 and that can be used for controlling the work unit 32 and output are defined in a memory 33 of the controller 31. Multiple workpiece parameters P1 through Pm, especially all those that are relevant are also defined in the memory 33. Both the number and the values of the press process values A1 through An and workpiece parameters P1 through Pm that are stored in the memory 33 are changeable.

Figure 2:
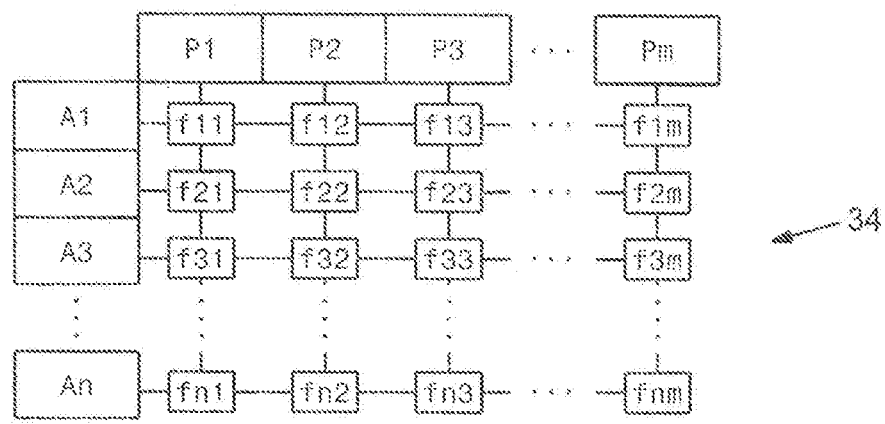
FIG. 2 is a function matrix stored in the controller of the press from FIG. 1.

All press process value A1 through An are linked with each defined workpiece parameter P1 through Pm through a composition matrix 34 (FIG. 2). Every matrix element or every node in this composition matrix 34 is formed by an individually changeable function f11 through fnm. Through this composition matrix 34 it is possible to define the relationship between every defined workpiece parameter P1 through Pm and every press process value A1 through An by adapting every one of the individually changeable functions f11 through fnm. This composition matrix 34 is stored in the memory 33 of the controller 31, resulting in very many possible adjustments to adapt the press 10 to a shaping job. Consequently, the press 10 is very flexibly adjustable to different shaping jobs.

Figure 3:
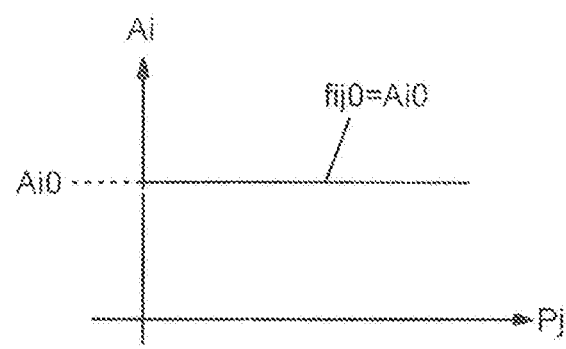
FIG. 3 is a function from the function matrix in FIG. 2 in an initial state.

In an initial state fij0, an individually changeable function fij defines the independence between the associated workpiece parameter pj and the associated press process value Ai, as is schematically illustrated in FIG. 3. In its initial state fij0, the function fij outputs a constant value Ai0 for the press process value Ai, independent of the amount of the associated workpiece parameter Pj.

Every individually adaptable function fij is in this initial state fij0 as long as no relationship is known between the associated workpiece parameter Pj and the associated press process value Ai, and as long as it is not otherwise adjusted by an operator. Here each i, j is a natural number greater than zero.

Figure 4:
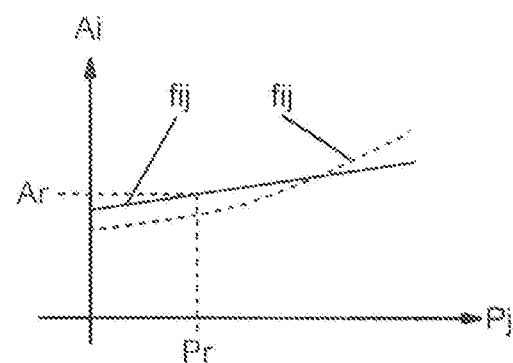
FIG. 4 is a function in the function matrix of FIG. 2, which indicates a known relationship between a workpiece parameter and a press process value.

FIG. 4 shows examples of curves for an individually adaptable function fij, for which there is a dependence between the press process value Ai and the workpiece parameter Pj. Preferably, the relationship between a workpiece parameter Pj and a press process value Ai is linear or at least sections of it are linear, as is illustrated by the solid line in FIG. 4. However, it is also possible to adjust other non-linear function curves, as is schematically illustrated by the dashed line in FIG. 4. To change a function fij, it is possible, for example, to specify multiple known points and determine other values by interpolation and/or extrapolation.

Figure 6:
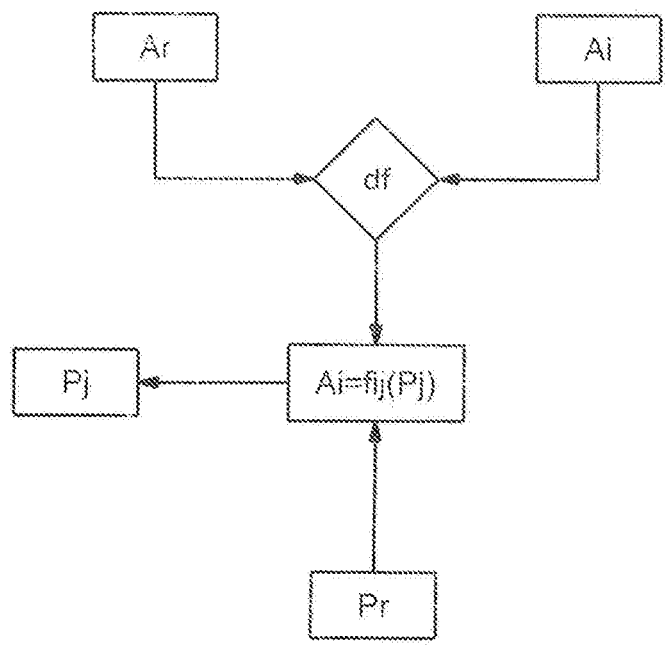
FIG. 6 is a flow chart illustrating the use of a known function between a workpiece parameter and a press process value, to adjust the workpiece parameter.

FIG. 6 illustrates the sample linear relationship illustrated in FIG. 4 once again, this time in the form of a block diagram. Assume that the coordinates of a reference point Pr/Ar and the slope df of the function fij are known. On the basis of this information, the workpiece parameter Pj can be adapted as desired by changing the press process value Ai in question.

At least one or more of the individually changeable functions fij is changed out of its respective initial state, to specify the dependence between the workpiece parameter Pj in question and the associated press process value Ai in the controller 31. To accomplish this, it is possible, for example, to convey input data D from an external data source 40 to the controller 31 through a communications link 41, as illustrated in FIG. 1. The input data D can define already known relationships between one or more of the workpiece parameters P1 through Pm and one or more of the press process values A1 through An. Such input data D can come from already operated presses 10, for example, which perform the same or similar shaping jobs and/or are operated under similar operating conditions and/or are of the same press type. The communications link 41 also allows the knowledge obtained during operation of the press 10, and adjustments of the functions f11 through fnm based on this knowledge, to be transferred externally and made available to other presses, for example.

As is illustrated in FIG. 1, the press 10 also has an operator interface 42, through which an operator can modify individual functions fij, for which a dependence is known between a press process value Ai and a workpiece parameter Pj. This dependence exists when the function fij in question has at least sections whose slope is not equal to zero (FIG. 4). To achieve certain workpiece parameters Pj, an operator can specify desired values for the Pj in question, so that the press automatically adjusts the associated press process values A1 through An according to the composition matrix 34.

The controller 31 can also output information to the user through the operator interface 42.

As is also illustrated in FIG. 1, the press 10 has multiple sensors 43 to determine one or more press process values Ai and transfer them to the controller 31, allowing closed-loop control of the press process values Ai in question. For example, the at least one sensor 43 can detect a rotational speed and/or a torque of a motor of the press drive 18 and/or a current position of the ram 12 in the stroke direction H and/or a sensor value describing the drawing force F, for example a hydraulic pressure in a lifting cylinder 25. The number of sensors 43 and the physical variable that each of them detects can vary depending on the embodiment of the press 10.

In the preferred sample embodiment shown, the press 10 also has a detection device 48 which can detect a detection signal B and transfer it to the controller 31. In the sample embodiment shown, the detection device 48 has at least one or preferably multiple optical sensors and, according to the example, cameras 49. The detection signal provided by a camera 49 is a picture B of a surface section of a shaped workpiece 11. According to the example, the picture B is taken as long as the shaped workpiece 11 is still located in the area between the lower tool 15 and the upper tool 14 and has not yet been removed from the tool. The picture B can also be taken while the shaped workpiece 11 is being moved, for example during its transfer by a transfer device of the press. On the basis of the detection signal B and, according to the example, the pictures of the camera 49, it is possible to determine one or more workpiece parameters P1 through Pm of the shaped workpiece 11 in the controller 31. For example it is possible to check, on the basis of the pictures, whether cracks, folds, or undulations have formed in an area of the shaped workpiece 11 or whether scores are present in the surface. Moreover, it is possible to determine, on the basis of image processing processes, one or more measurements on the shaped workpiece 11, for example an indentation E (FIG. 5).

Figure 5:
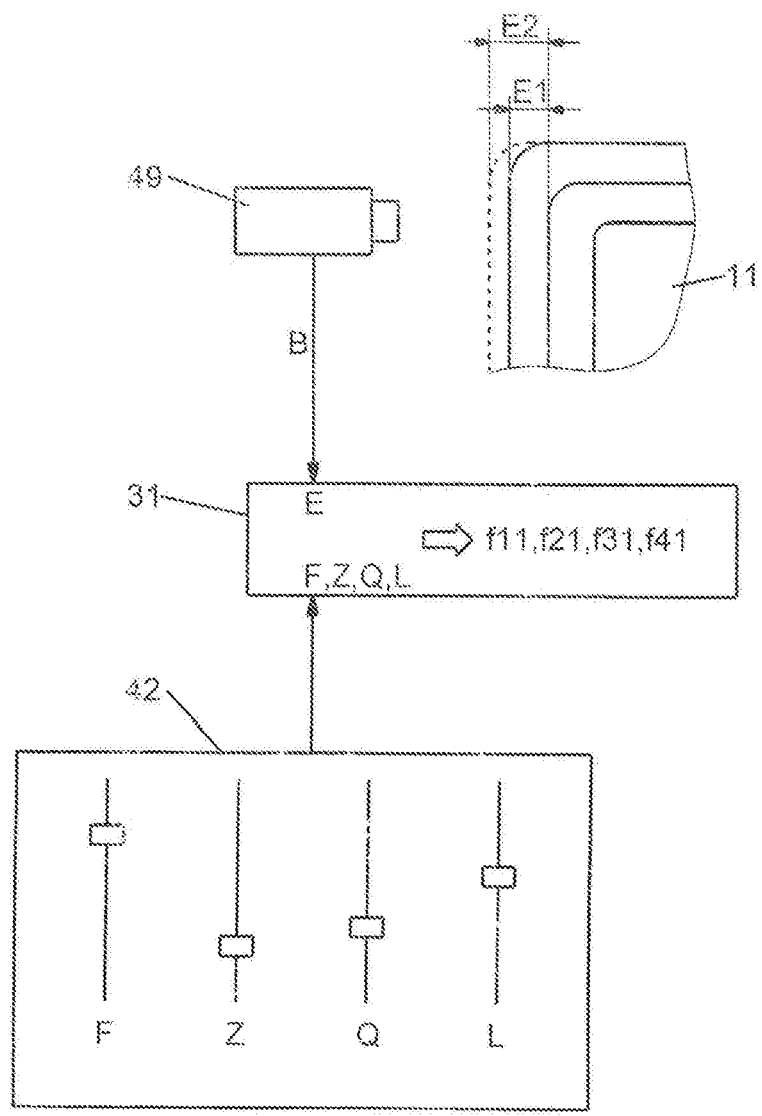
FIG. 5 is a representation of an example of the relationship between individual press process values and a workpiece parameter for determining the functions in question of the function matrix.

FIG. 5 illustrates an example of a workpiece parameter, according to the example the indentation E, and its dependence on multiple press process values, according to the example:
- a drawing force F;
- a ram position-dependent drawing force progression Z;
- a drawing force transverse leveling Q, which describes a change in the drawing force F at different places on the tool 14, 15 in a plane transverse to the stroke direction;
- a lubricant quantity L, which the lubrication device 30 applies to the workpiece surface.

An operator can change, for example, one of these press process values, which in turn changes the indentation E from a first indentation value E1 to a second indentation value E2. This change can be detected manually or, according to the example, automatically using the detection device 48 with the at least one camera 49. From this change, it is then possible to determine the dependence between the changed press process value and the indentation E. This can be done separately for all press process values in order to determine, on the basis of the corresponding functions, the respective dependence and the respective influence of a press process value on the indentation E, if the relationship is not yet known.

Conversely, if the dependences are already known by the functions, the operator can specify a desired indentation E through the operator interface 42 by adapting one or more of the press process values on which the indentation E depends.

It is also possible to adapt one or more of the press process values automatically, if a workpiece parameter is increasingly changing and approaching a tolerance limit. This can occur, for example, if temperature changes or wear affect the shaping of the workpiece 11.

The controller 31 uses each of the functions f11 through fnm to determine the press process values A1 through An. The only functions fij that have an effect are those which have at least sections whose slope is not equal to zero, and thus produce a change of the press process value Ai in question if a corresponding change is made in the associated workpiece parameter Pj. Those functions fij, for which a relationship between the associated press process value Ai and the associated workpiece parameter Pj is not known, or for which it is known that there is no relationship, do not change the associated press process value Ai, even if the associated workpiece parameter Pj changes, so that the function fij in question assumes its initial state fij0 (FIG. 3).

The press 10 is flexibly adjustable to different shaping jobs by means of this composition matrix 34. Changes due to external influences such as wear, temperature, etc., can be compensated for by a simple adjustment of one or more of the functions fij. If a priori knowledge is available for relationships of individual workpiece parameters with individual press process values, this a priori knowledge can be stored in the memory 33 of the controller 31 before the press 10 is put into operation, which greatly simplifies the adjustment of the press 10 to a shaping job. This simple adaptation is possible on the basis of the composition matrix 34. An operator can carry out the required application-dependent and/or environment-dependent adaptations simply and quickly through the operator interface 42. Depending on the availability of the a priori knowledge, an adjustment phase for adjustment of a press 10 can be substantially shortened, which in particular lowers the consumption of materials and the associated costs.

The invention relates to a press 10 and a process for operating it. The press 10 has an upper tool 14 and a lower tool 15 for shaping a workpiece 11. A work unit 32 of the press 10, which includes, for example, a press drive 18 and/or a drawing device 20, is controllable by a controller 31, to perform the shaping process. The controller 31 outputs, to the work unit 32, press process values A1 through An, which define the sequence of events of the shaping process. Workpiece parameters P1 through Pm characterize, for example, the material and/or the shape and/or at least one dimension and/or quality of the workpiece 11, which still has to be shaped or has already been shaped. The controller 31 is assigned a composition matrix 34 which contains, for each defined workpiece parameter P1 through Pm and for each defined press process value A1 through An, an individually changeable function f11 through fnm, to be able to describe the relationship between every one of the defined workpiece parameters P1 through Pm and every one of the defined press process values A1 through An. This composition matrix 34 allows a quick and rapid adjustment and adaptation of the press 10.

LIST OF REFERENCE NUMBERS

10 Press
11 Workpiece
12 Ram
13 Press frame
14 Upper tool
15 Lower tool
16 Press table
17 Drive device
18 Press drive 20 Drawing device
21 Blank holding device
22 Blank holding ring
23 Thrust bolt
24 Suspended plate
25 Lifting cylinder
26 Blank holding surface
27 Hydraulic unit
30 Lubrication device
31 Controller
32 Work unit
33 Memory
34 Composition Matrix
40 External data source
41 Communications link
42 Operator interface
43 Sensors
48 Detection device
49 Camera
A1-An Press process value
B Detection signal
D Input data
df Slope
E Indentation
E1 First indentation value
E2 Second indentation value
f11-fnm Individually changeable function
F Drawing force
L Lubricant quantity
P1-Pm Workpiece parameter
Q Drawing force transverse leveling
Z Drawing force progression

What is claimed is:

1. A press (10) for shaping workpieces (11), the press (10) comprising:
   an upper tool (14) and a lower tool (15), which cooperate to shape a workpiece (11),
   a work unit (32) that is controllable by a controller (31), the work unit (32) is configured to perform the shaping process of the workpiece (11) based on a predetermined number of press process values (A1 through An), wherein n is equal to the number of press process values,
   the controller (31) is configured to specify the press process values (A1 through An) for the work unit (32), the controller (31) having a composition matrix (34) stored in it, which contains, for each of the press process values (A1 through An) a linked at least one workpiece parameter (P1 through Pm), one individually changeable function (fij) respectively, describing the relationship between the respective press process value (Ai) and a respective workpiece parameter (Pj) of the linked at least one workpiece parameter (P1 through Pm),
   the at least one workpiece parameter (P1 through Pm) characterizing the workpiece (11) that is to be shaped and/or has been shaped, wherein in is equal to the number of workpiece parameters, the composition matrix (34) includes a predetermined number of the individually changeable functions (fij) equal to the product of the number of press process values n times the number of workpiece parameters in as matrix elements of the composition matrix (34),
   the controller (31) being configured to use all available individually changeable functions (f11 through fnm) for determination of the press process values (P1 through Pn) and to output them to the work unit (32),
   the controller (31) being configured to receive input data (D), which characterizes an actual relationship between one of the press process values (Ai) and one of the workpiece parameters (Pj), and the controller (31) is configured to adapt the respective individually changeable function (fij) to the actual relationship, and,
   an operator interface (42) is configured to input to the controller (31) input data (D) of an operator to selectively and individually modify as desired any of the adapted individually changeable functions (f11 to fnm) and to output the desired selected modified individually changeable functions (f11 to fnm) to the work unit (32) while the other of the individually changeable functions (f11 to fnm) remain unchanged.

2. The press according to claim 1, characterized in that in an initial state every individually changeable function (f11 through fnm) defines an independence between the respective press process value (Ai) and the respective workpiece parameter (Pj).

3. The press according to claim 1, characterized in that the controller (31) is connected, through a communications link (41), with an external data source (40), so that input data (D) can be received from the external data source (40).

4. The press according to claim 1, further comprising a detection device (48) that is configured to create a detection signal (B) describing one or more of the workpiece parameters (P1 through Pin) and to forward the detection signal (B) to the controller (31) for determination of the at least one workpiece parameter (P1 through Pin).

5. The press according to claim 1, characterized in that the work unit (32) has a drawing device (20) configured to adjust a drawing force value (F) and/or a drawing force behavior (F, Z), the drawing force value (F) and/or the drawing force behavior (F, Z) each being characterized by each of one or more of the press process values (Ai).

6. The press according to claim 5, characterized in that the drawing device (20) is configured to adjust different drawing force values (F, Q) and/or drawing force behaviors (F, Z, Q) at different locations on the upper tool (14) and the lower tool (15), the drawing force values (F, Q) and/or drawing force behaviors (F, Z, Q) each being characterized by one or more of the press process values (Ai).

7. The press according to claim 1, characterized in that the work unit (32) has a lubrication device (30) connected in operative arrangement with the controller (31), which is configured to apply a lubricant onto the workpiece (11) before shaping, the lubricant quantity (L) of the lubricant applied onto the workpiece (11) being characterized by one or more of the press process values (Ai).

8. The press according to claim 1, characterized in that the controllable work unit (32) has a drive device (18), that is configured to move the upper tool (14) and the lower tool (15) relative to one another, and that the drive device (18) is configured to adjust the position and/or a time derivative of the position of the upper tool (14) and/or of the lower tool (15), the position and/or a time derivative of the position each being characterized by each of one or more of the press process values (Ai).

9. The press according to claim 1, characterized in that at least one of the workpiece parameters (P1 through Pin) describes a dimension of the shaped workpiece (11).

10. The press according to claim 1, characterized in that at least one of the workpiece parameters (P1 through Pin) indicates whether ripples or folds are present in a surface section of the shaped workpiece (11).

11. The press according to claim 1, characterized in that at least one of the workpiece parameters (P1 through Pin)

indicates whether at least one crack is present in a surface section of the shaped workpiece (11).

12. A method for operating the press (10) as claimed in claim 1,
   the method for operating the press (10) comprising the following steps:
   determining the press process values (A1 through An) on the basis of all functions (f11 through fnm),
   outputting to the work unit (32) the determined press process values (A1 through An), and,
   performing the shaping process on the workpiece (11) by the work unit (32) on the basis of each of the current press process values (A1 through An).

\* \* \* \* \*